US012580301B2

(12) United States Patent
Pohl et al.

(10) Patent No.: US 12,580,301 B2
(45) Date of Patent: Mar. 17, 2026

(54) ANNULAR DEVICE FORMATION

(71) Applicant: Infineon Technologies AG, Neubiberg (DE)

(72) Inventors: Jens Pohl, Bernhardswald (DE); Michael Huber, Nittendorf/Undorf (DE); Walther Pachler, Graz (AT); Stephan Rampetzreiter, Graz (AT)

(73) Assignee: Infineon Technologies AG, Neubiberg (DE)

( * ) Notice: Subject to any disclaimer, the term of this patent is extended or adjusted under 35 U.S.C. 154(b) by 216 days.

(21) Appl. No.: 18/463,458

(22) Filed: Sep. 8, 2023

(65) Prior Publication Data

US 2024/0097316 A1 Mar. 21, 2024

(30) Foreign Application Priority Data

Sep. 19, 2022 (DE) ......................... 102022123949.7

(51) Int. Cl.
*H01Q 1/27* (2006.01)
*H01Q 1/38* (2006.01)
*H01Q 1/50* (2006.01)

(52) U.S. Cl.
CPC ............... *H01Q 1/273* (2013.01); *H01Q 1/38* (2013.01); *H01Q 1/50* (2013.01)

(58) Field of Classification Search
CPC ............ H01Q 1/273; H01Q 1/38; H01Q 1/50; H01Q 7/00
See application file for complete search history.

(56) References Cited

U.S. PATENT DOCUMENTS

| | | | | |
|---|---|---|---|---|
| 11,011,282 | B1 * | 5/2021 | Dong | H01P 7/08 |
| 11,829,831 | B1 * | 11/2023 | Ershov | H01Q 1/2208 |
| 2010/0253476 | A1 * | 10/2010 | Poutiatine | G16H 10/65 340/10.1 |
| 2015/0235063 | A1 * | 8/2015 | Loussert | G06K 7/10178 340/10.1 |
| 2016/0235365 | A1 * | 8/2016 | Liu | A61B 5/1473 |
| 2017/0277990 | A1 * | 9/2017 | Tokunaga | G06K 19/0725 |
| 2019/0387848 | A1 * | 12/2019 | Leybourn | G06K 19/0779 |
| 2022/0121897 | A1 * | 4/2022 | Schiffer | G06K 19/07749 |
| 2023/0292889 | A1 * | 9/2023 | Schiffer | G06K 19/07762 |
| 2023/0410041 | A1 * | 12/2023 | Roth | G06Q 20/208 |

FOREIGN PATENT DOCUMENTS

DE 102014019224 A1 7/2015

OTHER PUBLICATIONS

May 5, 2023 (DE) Office Action—App. 102022123949.7.

* cited by examiner

*Primary Examiner* — Thien M Le
(74) *Attorney, Agent, or Firm* — Banner & Witcoff, Ltd.

(57) ABSTRACT

An antenna structure for a contactless wearable structure having a plurality of antenna tracks on the substrate, the opposite ends of which are connectable to form an antenna when the substrate is bent, a plurality of capacitor elements on the substrate that are couplable to the antenna for adjusting the resonance frequency of the antenna, and at least one predefined separation region, by means of which it is possible to adjust which of the plurality of capacitor elements are electrically conductively connectable to the antenna when the substrate is bent, in order to form at least one capacitor with a predetermined total capacitance that is electrically conductively coupled to the antenna.

18 Claims, 11 Drawing Sheets

ANNULAR DEVICE FORMATION

TECHNICAL FIELD

The disclosure relates to an antenna structure, a method for forming an antenna structure, an annular device and a method for forming an annular device.

BACKGROUND

In recent years, wearable electronic devices (wearables) with contactless (CL) function have often been provided in the form of a ring intended to be worn on a finger.

Such rings, also known as smart rings, are used, for example, for payment functions, access control and similar operations.

For the contactless function, the ring typically uses a chip with a security function (a so-called Secure Element (SE)), an antenna connected thereto, and passive elements for adjusting a resonance frequency of the antenna.

The resonance frequency is typically set to 13.56 MHz, and capacitors are commonly used to adjust the antenna (also called tuning or trimming).

However, a capacitance required for the adjustment varies with a diameter of the ring, because regardless of how the antenna is formed (e.g. as a wound (e.g. copper) wire or as a wire structure printed onto a flexible substrate, e.g. a printed circuit board (PCB), which is bent into a circle and soldered together at the ends), the antenna is typically formed in the shape of a plurality of coils running in the circumferential direction.

In currently available smart rings, the resonance frequency adjustment is typically carried out in such a way that capacitors (usually two) matching the intended ring diameter are soldered on individually, e.g. by hand.

The individual adjustment required means a low degree of automation, which is already costly in any case. In addition, a large Smart Ring family comprising many sizes requires many different accessory components, which also increases costs.

SUMMARY

In various exemplary embodiments, an antenna structure is provided which simplifies the production of a ring-shaped device as a contactless wearable structure by eliminating the need to attach additional passive components for tuning.

In various exemplary embodiments, an antenna structure for a contactless wearable structure is provided, which has a flexible substrate having a plurality of antenna tracks on the substrate, the opposite ends of which can be connected to form an antenna when the substrate is bent. Furthermore, the antenna structure comprises a plurality of capacitor elements on the substrate which can be coupled to the antenna for adjusting the resonance frequency of the antenna, and at least one predefined separation region, by means of which it is possible to adjust which of the plurality of capacitor elements can be electrically conductively connected to the antenna when the substrate is bent, in order to form at least one capacitor with a predetermined total capacitance that is electrically conductively coupled to the antenna.

In various exemplary embodiments, an antenna structure for a contactless wearable structure is provided, which has a flexible substrate having a plurality of antenna tracks on the substrate, which extend towards two opposite ends of the substrate and can be connected to form an antenna when the substrate is bent. Further, the antenna structure comprises a plurality of capacitor elements having a first capacitor element with a first capacitor element terminal, wherein the first capacitor element has a first capacitor element terminal, the first capacitor element terminal extending in the direction of one of the two opposite ends of the substrate up to a first distance from the end of the substrate, the first distance being greater than or equal to zero, and having a second capacitor element with a second capacitor element terminal, wherein the second capacitor element terminal extends in the direction of one end of the substrate up to a second distance from one end of the substrate, which is greater than or equal to the first distance, wherein the first and optionally the second capacitor element can be electrically conductively connected to the antenna when the substrate is bent, in order to form at least one capacitor electrically conductively coupled to the antenna with a predetermined total capacitance for adjusting the resonance frequency of the antenna.

BRIEF DESCRIPTION OF THE DRAWINGS

Exemplary embodiments of the disclosure are shown in the drawings and will be explained in more detail in the following.

In the drawings.

DETAILED DESCRIPTION

Figure 1A:
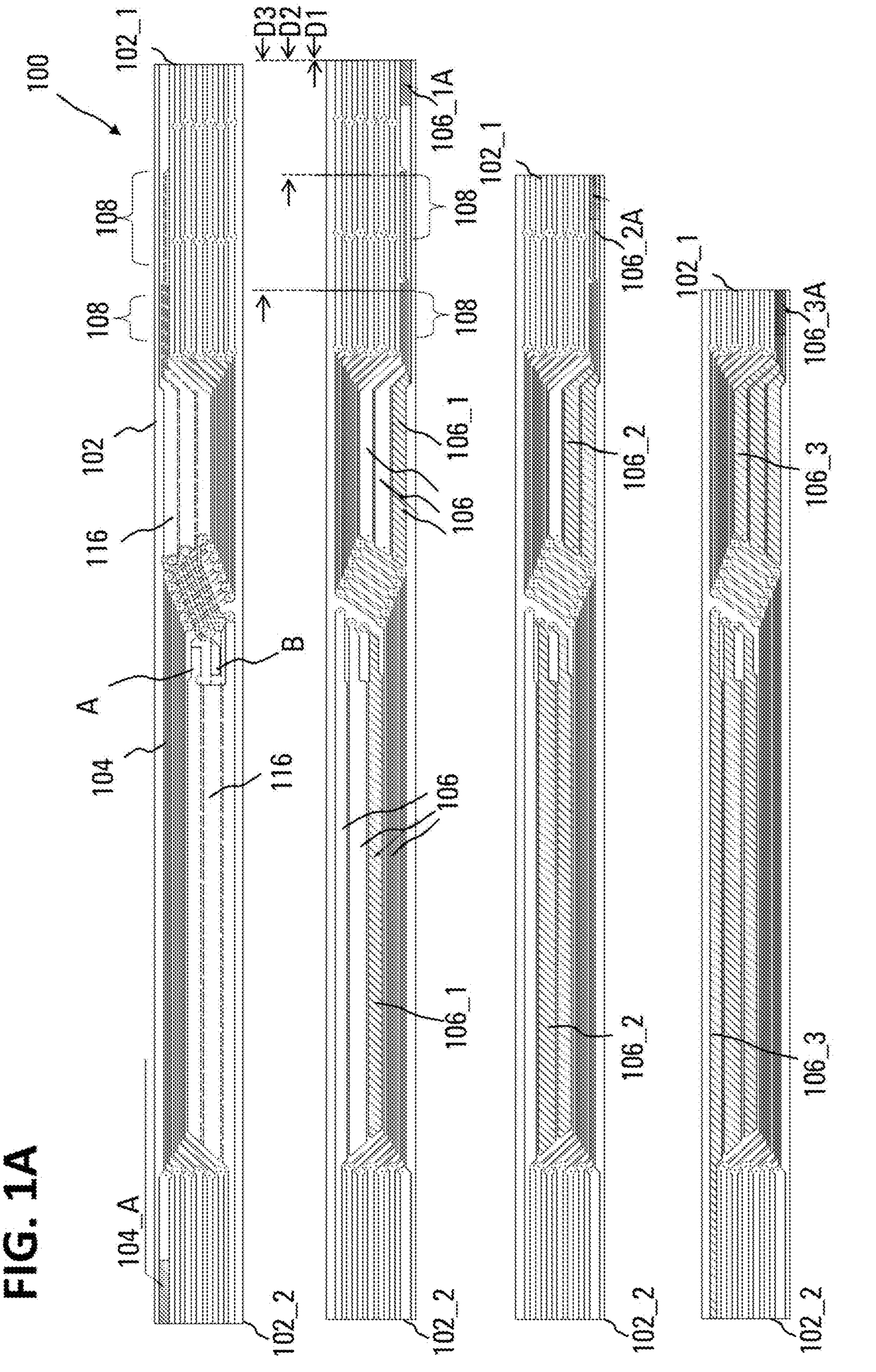
FIG. 1A shows schematic views of an antenna structure according to various exemplary embodiments.

In the detailed description that follows, reference will be made to the attached drawings, which form part of this description and in which specific embodiments in which the invention may be realized are shown for illustration purposes. In this respect, directional terms such as “at the top”, “at the bottom”, “in front”, “behind”, “frontal”, “rear”, etc.

are used with respect to the orientation of the figures being described. Because components of embodiments can be positioned in a number of different orientations, the directional terminology is used for illustration purposes only, and is in no way restrictive. It is understood that other embodiments can be used and structural or logical changes can be made without departing from the scope of protection of the present invention. It goes without saying that the features of the various exemplary embodiments described herein can be combined with one another, unless specifically stated otherwise. The following detailed description is therefore not to be understood in a restrictive sense, and the scope of protection of the present invention is defined by the attached claims.

For the purposes of this description, the terms "connected" and "coupled" are used to describe both a direct and an indirect connection, as well as a direct or indirect coupling. In the figures, identical or similar elements are labeled with identical reference signs, where this is appropriate.

In an annular device which is provided for use as a contactless wearable structure, as described above at least one passive structure (e.g. a capacitor) is required to set a resonance frequency of an antenna used for the contactless function to a frequency expected by a reader device (typically 13.56 MHz).

The required capacitance varies with the diameter of the annular device.

With parameters otherwise kept constant (e.g. conductivity of the antenna material, width, thickness and spacing between antenna tracks, number of coils), for example, an additionally required capacitance for a ring with a diameter of 17 mm can be 55 pF, and for a ring with a diameter of 21 mm, 34.3 pF.

These numerical values, the absolute value of which depends on the input parameters, are used merely to illustrate that rings with a smaller diameter require a capacitor with higher capacitance.

To produce the annular device, an antenna structure according to various exemplary embodiments is used, the ends of which are connected to each other in such a way that the annular device with an antenna extending in the circumferential direction is obtained.

Accordingly, a shorter antenna structure (for a smaller diameter ring) requires a higher capacitance, while a longer antenna structure (for a larger diameter ring) requires a lower capacitance.

In simple terms, in various exemplary embodiments an antenna structure for a contactless wearable structure is provided, wherein antenna tracks and a plurality of capacitor elements in the antenna structure are arranged in such a way that the antenna structure can be cut to length, wherein during cutting, in the respective connection region generated thereby near the edge, additional capacitor element terminals are provided which can be used for the additional connection of capacitor elements, which in the annular assembled state form a capacitor with a capacitance that compensates the additional capacitance requirement due to the ring size reduction.

In other words, cutting the antenna structure to length at different distances from the original edge provides connection possibilities for capacitor elements, which in total have a capacitance that is suitable for setting a resonance frequency close to the intended resonance frequency for the ring diameters within a given size range. Depending on the ring diameter, the resonance frequency can deviate from the ideal frequency by a tolerable value, which in particular allows smaller gradations of the ring diameter within a size range of the ring diameter.

Figure 1B:
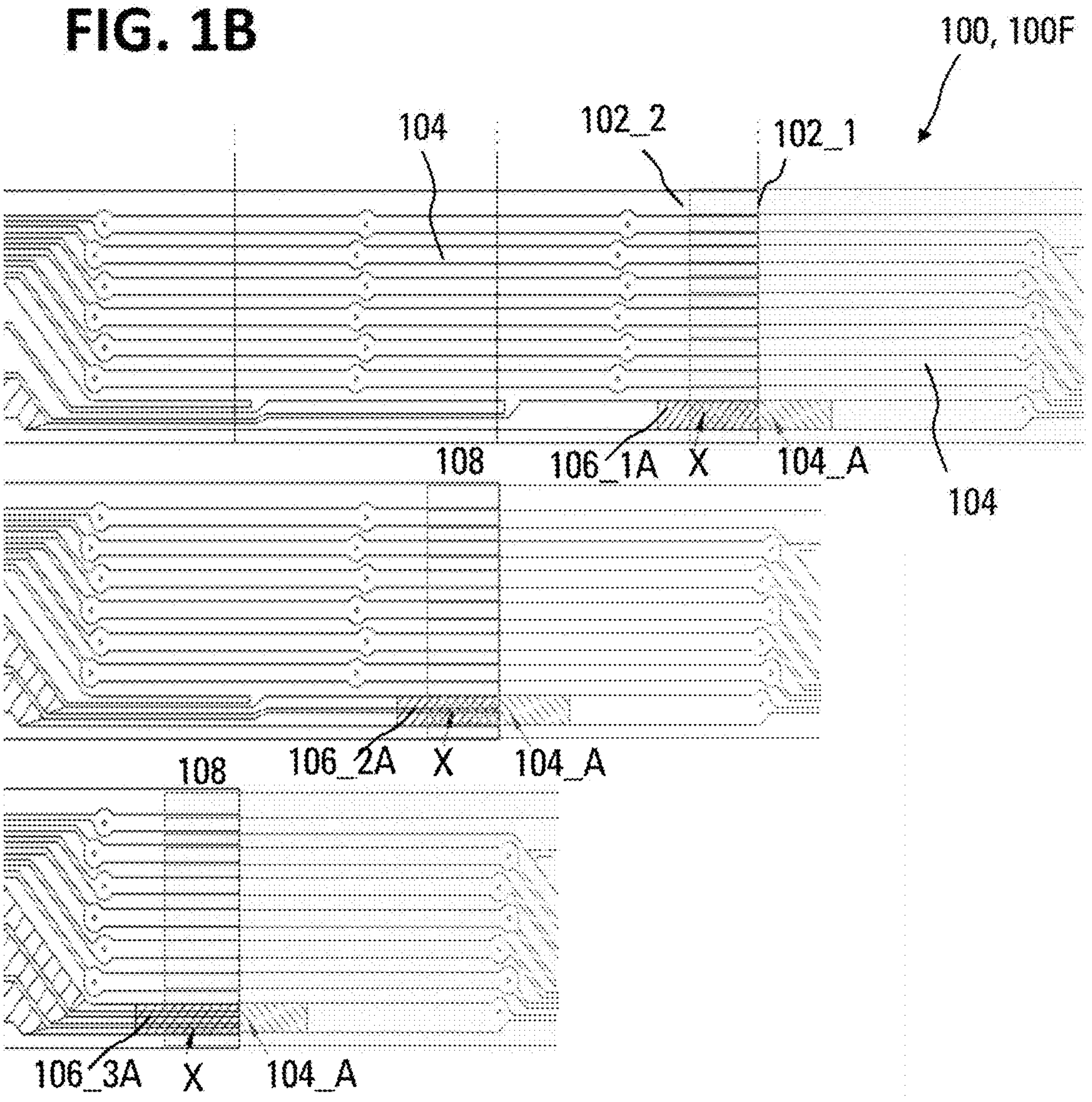
FIG. 1B shows an illustration of how ends of the antenna structure of FIG. 1A are connected to form an annular device.
Figure 2A:
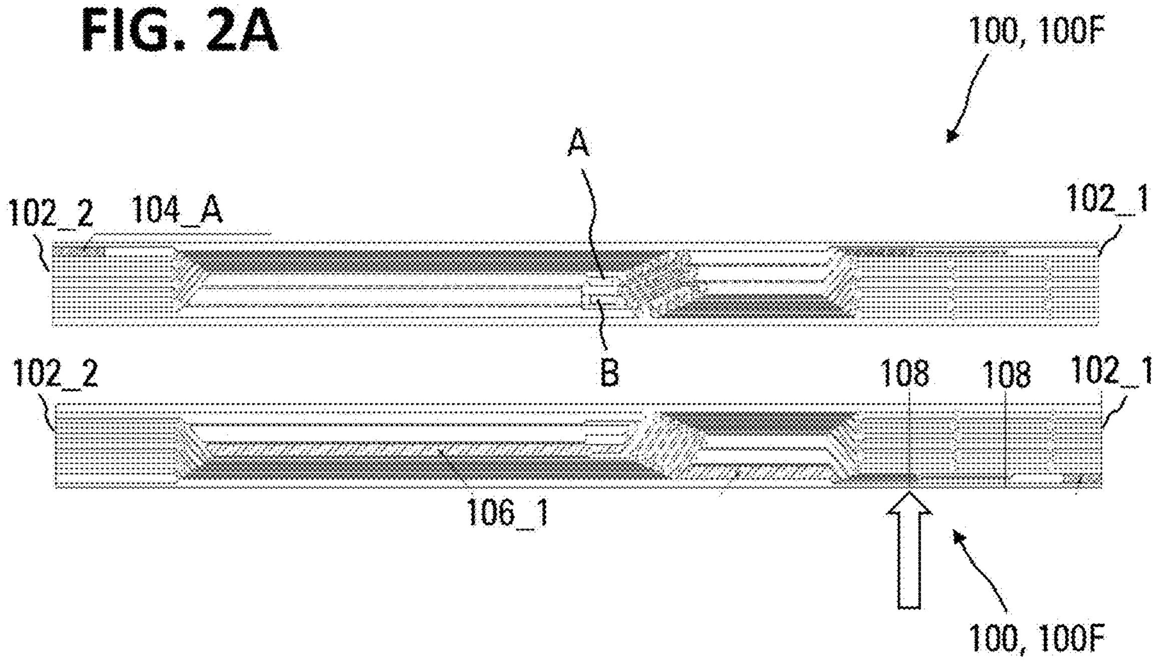
FIG. 2A shows a schematic view of an antenna structure according to various exemplary embodiments.
Figure 2B:
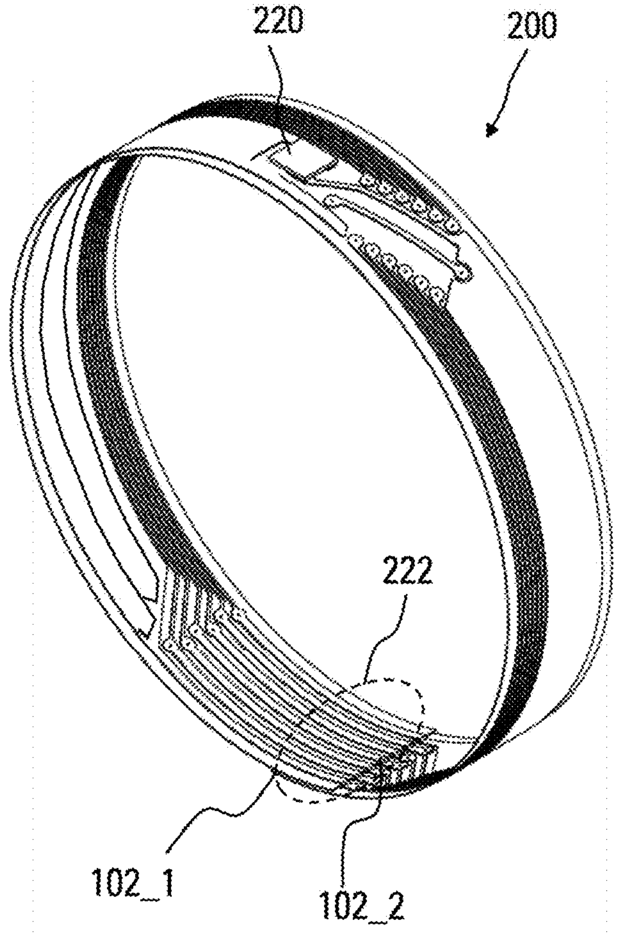
FIG. 2B shows a schematic perspective view of an annular device according to various exemplary embodiments, which is formed by means of an antenna structure according to various exemplary embodiments.

FIG. 1A shows schematic views of an antenna structure 100 according to various exemplary embodiments, which is intended for a contactless wearable structure; FIG. 1B shows a detailed illustration of how ends of the antenna structure 100 from FIG. 1A are connected to form an annular device, and FIG. 2A shows a schematic view of an antenna structure 100 according to various exemplary embodiments, which is intended for a contactless wearable structure, and FIG. 2B shows a schematic perspective view of an annular device 200 according to various exemplary embodiments, which is formed by means of an antenna structure 100 according to various exemplary embodiments.

The antenna structure 100 has a flexible substrate 102 having a plurality of antenna tracks 104 on the substrate 102.

Materials and techniques for forming the flexible substrate 102 and the antenna tracks 104 can substantially correspond to materials and techniques known from the prior art. For example, the substrate 102 with the antenna tracks 104 may be formed as a printed circuit board (PCB). The substrate material may, for example, comprise or consist of a polymer, for example polyimide or another polymer, which is suitable for subsequent treatment processes, for example, an application and structuring of a metallization layer to form the antenna tracks 104 and of capacitor elements, which are described in more detail below.

The antenna tracks 104 are formed such that their opposite ends are connected to form an antenna when the substrate 102 is bent.

Further, the antenna structure 100 has a plurality of capacitor elements 106 which can be coupled to the antenna (for distinguishing purposes, the individual capacitor elements are designated by appended digits as 106_1, 106_2, 106_3) on the substrate 102 for adjusting a resonance frequency of the antenna.

Typically, contactless wearable structures communicate in a standardized manner at a frequency of 13.56 MHz, and the resonance frequency is set to this or near to this frequency. In principle, however, it would also be possible to set the resonance frequency to a different predetermined value.

The antenna structure 100 also comprises at least one predefined separation region 108, by means of which it is possible to adjust which of the plurality of capacitor elements 106 can be electrically conductively connected to the antenna when the substrate 102 is bent, in order to form at least one capacitor with a predetermined total capacitance that is electrically conductively coupled to the antenna.

The antenna structure 100 shown in FIG. 1A is suitable for being formed over its full length into an annular device 200, which forms a ring-like contactless wearable structure.

In FIG. 1A, the top two figures show the full length of the antenna structure 100, the top figure showing one side of the antenna structure 100, which is provided for mounting a chip (also referred to as the chip side or front side), and the second figure shows, from above, a rear side of the antenna structure 100 opposite the front side. The illustration of the front side shows the structures of the rear side in dashed lines.

The annular device 200 can be formed by mechanically connecting together opposite ends of the antenna structure 100 at which ends of the antenna tracks 104 are located, and by electrically connecting the respective ends of the antenna tracks 104 to each other, for example by soldering or gluing using an electrically conductive adhesive, such that an antenna with a plurality of antenna coils is formed.

This is shown in FIG. 1B.

In all figures of FIG. 1B, the right-hand first end 102_1 of the antenna structure 100 from FIG. 1A is shown in black and extending from the left. The left-hand second end 102_2 of the antenna structure from FIG. 1A, shown in gray extending from the right, is brought into overlap with the first end 102_1 after bending of the antenna structure 100 into a ring shape. In this configuration, for forming the annular device 200, respective mutually overlapping ends of the antenna tracks 104 are electrically conductively connected to each other.

Furthermore, one of the antenna terminals 104_A is electrically conductively connected to at least one of the capacitor elements 106, for example in the cross-hatched overlap region X.

The electrically conductive connection can be produced, for example, by means of soldering, by means of an (for example anisotropic) electrically conductive adhesive, by means of laser welding or any other suitable method. The solder or the electrically conductive adhesive can in various exemplary embodiments already be arranged on the antenna terminals 104_A and in others, on the capacitor element terminals 106_A, or be provided during the connection process.

The connections to be soldered/bonded can be quite finely structured, so that, for example, solder resist masks can be used (for example, on the front and/or rear of the antenna structure) to avoid short circuits. These solder resist masks are not shown.

The electrically conductive connection operation can already provide a sufficient mechanical connection, because typically, after completion of the annular device 200, the device will be inserted (e.g. embedded in a potting material or a housing consisting of, for example, adhesively bonded or locked half-shells) at least into an aesthetically appealing (and retaining) housing (material), and possibly in other materials also.

In case a mechanical connection is also required, for example, additional regions in the overlap region can be connected by means of a non-conductive adhesive or another suitable type of mechanical connection can be used.

The antenna structure 100 is shown in its full-length in the top figure of FIG. 18. There, the overlap region X is formed as an overlap between the antenna terminal 104_A and a terminal 106_1A of a first capacitor element 106_1.

The capacitor element 106_1 thus connected to the antenna (each highlighted with hatching in FIG. 1A (second illustration from the top) and 18 (top illustration)) is configured, by means of an additional capacitor surface 116 which is arranged on the opposite (first) side of the substrate, electrically insulated from the capacitor element 106_1, to form a capacitor having a capacitance which sets the antenna to the predetermined resonance frequency.

According to an alternative exemplary embodiment, not shown, the capacitor element can already be connected permanently in an electrically conductive manner to the antenna over the full length, and the additional capacitor element terminals 106_A are provided in the separation regions 108 only for smaller ring sizes.

To create an annular device 200 with a smaller diameter, the antenna structure 100 can be severed at one of the predefined separation regions 108 and then joined together to form the annular device 200.

The severing can be carried out, for example, at the end (facing the first end 102_1) of the separation region 108, which can also act as and be designated as the joining region or connecting region, for example at a distance D2 from the first edge 102_1.

The severing not only causes a shortening of the antenna structure 100 to a length which corresponds to a suitable circumference for a desired ring size (with an additional portion for the overlap region), but also thereby arranges at least one additional capacitor element terminal 106_2A in an edge region near to the first end of the antenna structure, which means that this at least one additional capacitor element terminal 106_2A is located in the overlap region when the antenna structure 100 is bent into a ring and is accessible for connecting to the antenna terminal 104_1.

The third illustration in FIG. 1A and the second illustration in FIG. 1B show a case in which the antenna structure 100 is shortened to a medium length.

Thus, in addition to the capacitor element terminal 106_1A, a second capacitor element terminal 106_1B, which forms a connection for a second capacitor element 106_2 of the capacitor elements 106, is also located near the first edge 102_1.

The capacitor element terminal 106_1A is formed narrower in the region to make space for the second capacitor element terminal 106_2A. Both capacitor element terminals 106_1A, 106_2A can be or are connected to the antenna terminal 104_A.

In the third illustration from FIG. 1A and the second illustration from FIG. 1B, the two capacitor elements 106_1, 106_2 that are or can be connected to the antenna (and are then active) are highlighted by hatching. The additional capacitor surface 116 is configured as a second capacitor plate for the second capacitor element 106_2 also.

A similar procedure is used when shortening the antenna device 100 to an even shorter length for an even smaller ring size.

Here, the severing can be performed, for example, at the end (facing the first end 102_1) of another separation region 108, for example at a distance D3 from the first edge 102_1.

The severing not only causes a shortening of the antenna structure 100 to an even shorter length which corresponds to a suitable circumference for a desired ring size, but also thereby arranges at least one additional capacitor element terminal 106_3A in an edge region near to the first end 102_1 of the antenna structure 100, which means that this at least one additional capacitor element terminal 106_3A is located in the overlap region when the antenna structure 100 is bent into a ring and is accessible for connecting to the antenna terminal 104_1.

The capacitor element terminals 106_1A, 106_2A are formed narrower in the region to make space for the third capacitor element terminal 106_3A. All three capacitor element terminals 106_1A, 106_2A, 106_3A can be or are connected to the antenna terminal 104_A.

In the bottom illustration from FIG. 1A and the third illustration from FIG. 1B, the three capacitor elements 106_1, 106_2, 106_3, which can be or are connected to the antenna (and are then active) are highlighted with hatching. The additional capacitor surface 116 is configured as a second capacitor plate for the third capacitor element 106_3 also.

The cutting to length described above at different distances D1, D2, D3 from the original first edge 102_1 enables, as described above, the total capacitance to be set to a value that is required to set the resonance frequency in light of the ring size achieved by the cutting to length at the intervals D1, D2, D3. However, fine adjustments of the ring diameter are also possible by selecting the number of predefined separation regions 108 and the respective distances D1, D2, D3 from the first edge 102_1 in such a way that cutting-to-length to a distance from the first edge 102_1, which is, for example, D2/2, or (D2+D3)/2, for example, results in a resonance frequency that deviates from the optimum resonance frequency by less than a tolerance range.

Figure 4:
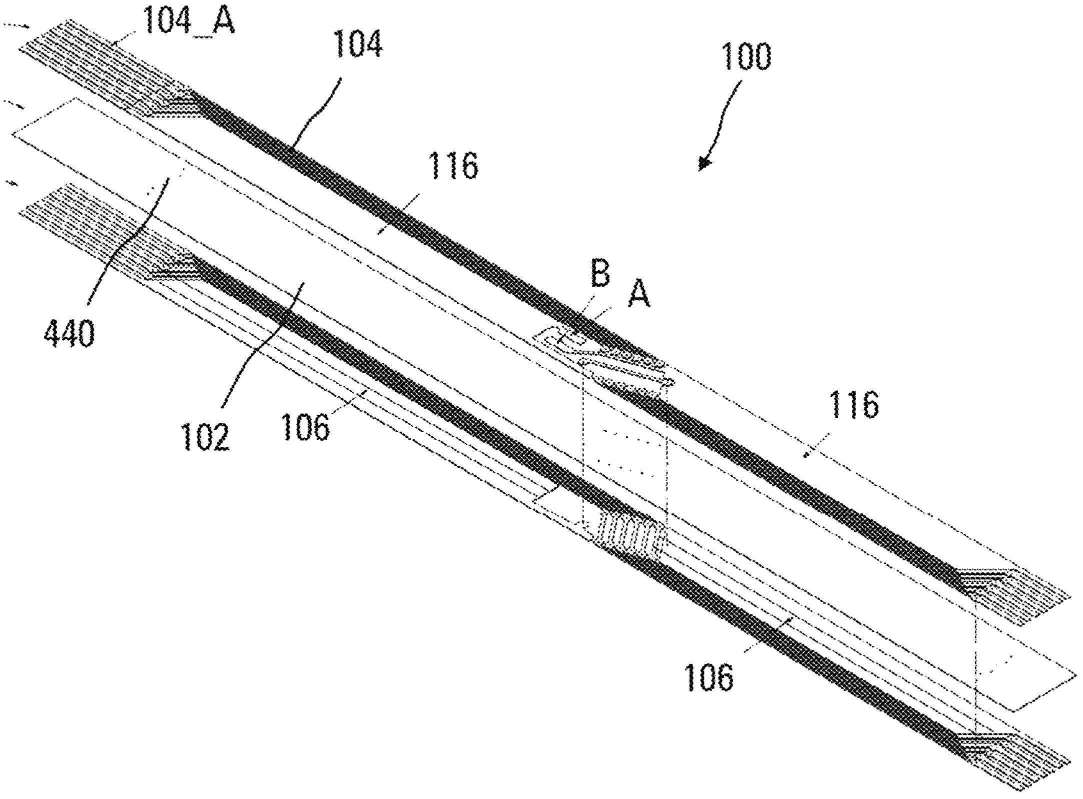
FIG. 4 shows an exploded drawing of an antenna structure according to various exemplary embodiments.

FIG. 4 shows an exploded drawing of an antenna structure 100 according to various exemplary embodiments, in which the relative positioning of the capacitor elements 106_1, 106_2, 106_3 and the capacitor surfaces 116 is illustrated graphically. The capacitor surfaces 116 are divided into two regions, one region on the left side which forms a parallel capacitor, and one region on the right side which forms a serial capacitor. Optionally, the ratio of parallel capacitance component to serial capacitance component can also be adjusted using the switchable capacitances. Basic designs can be implemented as described in DE 10 2018 105 383 B4, for example.

A connection between the electrically conductive structures on the front and rear sides of the antenna structure 100 can be provided by means of vias 440 in the substrate 102.

FIG. 2A and FIG. 2B at the top show the antenna structure 100 before severing at the separation region 108 at the position marked with an arrow, and after connecting the first end 102_1 and the second end 102_2 to form the annular device 200. In the labeling, it should be noted that the reference signs point to the respective edge, i.e. the first end is at the bottom in FIG. 2B, the second end 102_2 above it.

In FIG. 2B, the annular device 200 is further equipped with a chip 220, for example a secure element.

Figure 3A:
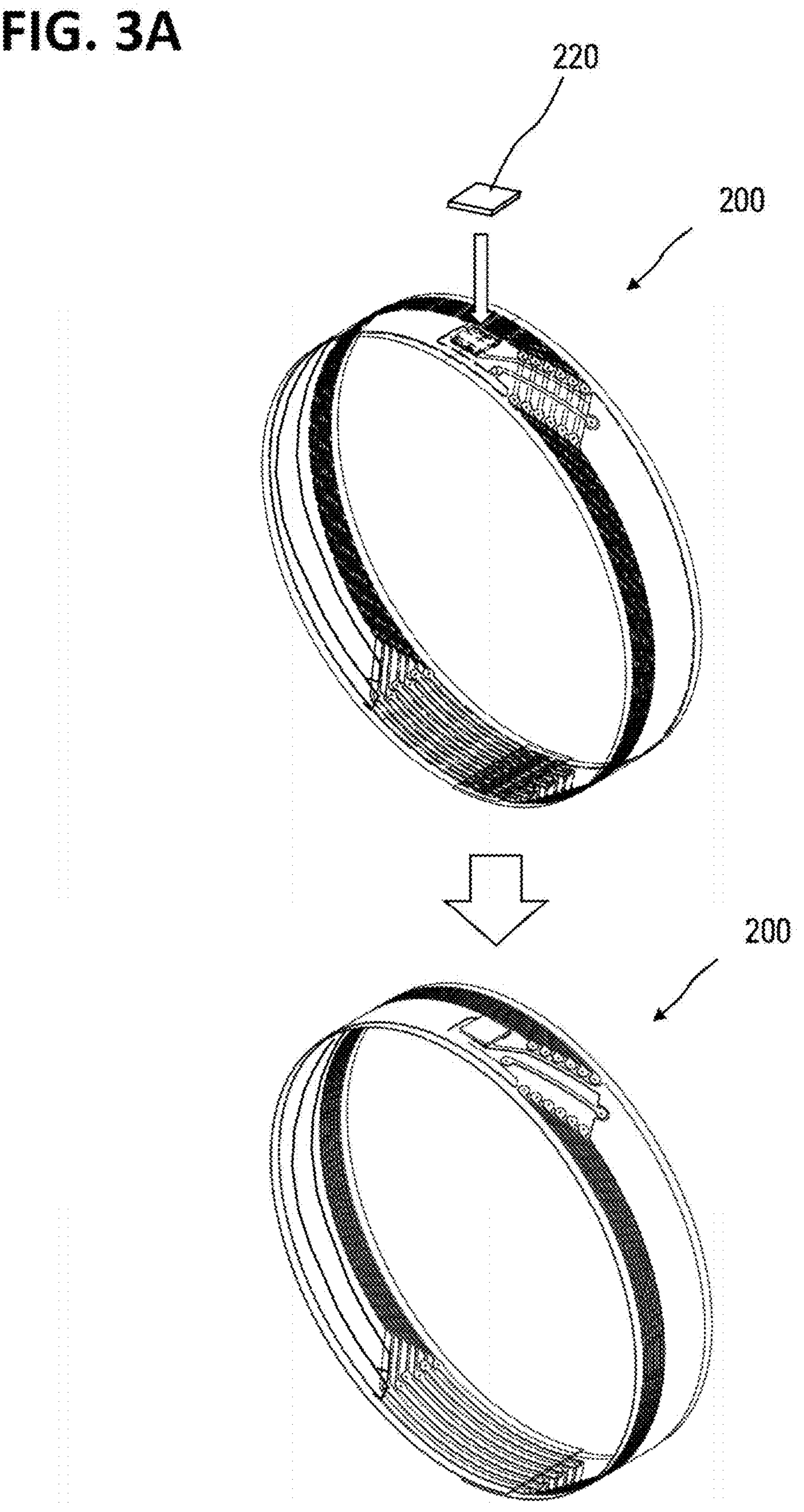
FIGS. 3A and 3B each illustrate an assembly process for a chip on an annular device according to various exemplary embodiments.

This can be mounted, for example, as shown in FIG. 3A, after the two ends of the antenna structure 100 are connected to form an annular device 200, for example by means of known technologies such as flip-chip mounting, mounting with subsequent connection by means of bond wires and protection by means of globtop, mounting an already packaged chip (for example, when using a chip provided as an ultra-thin small outline no-lead package (USON)), etc.

Figure 5:
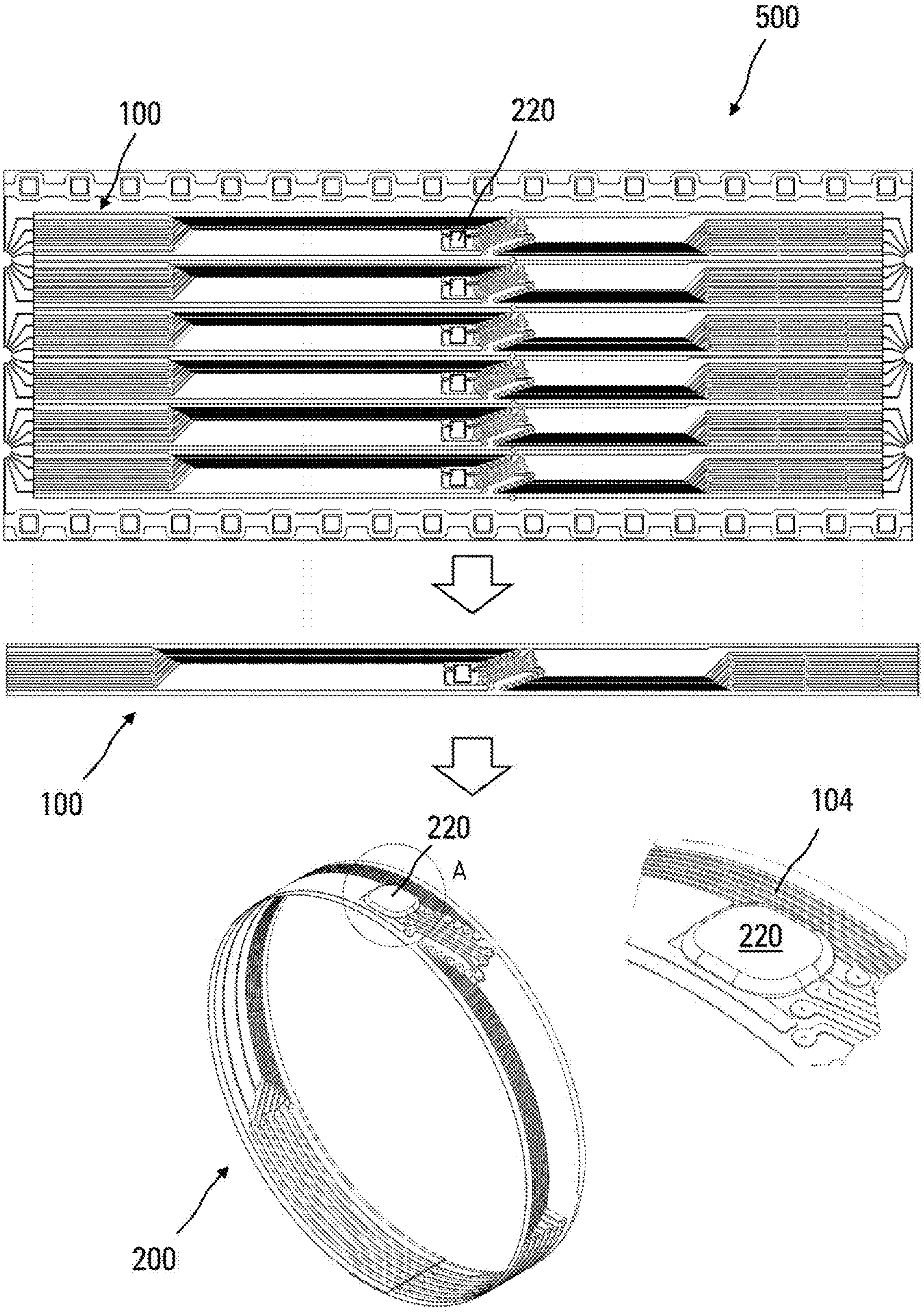
FIG. 5 illustrates a production process of an antenna structure according to various exemplary embodiments and of an annular device using the antenna structure.
Figure 6:
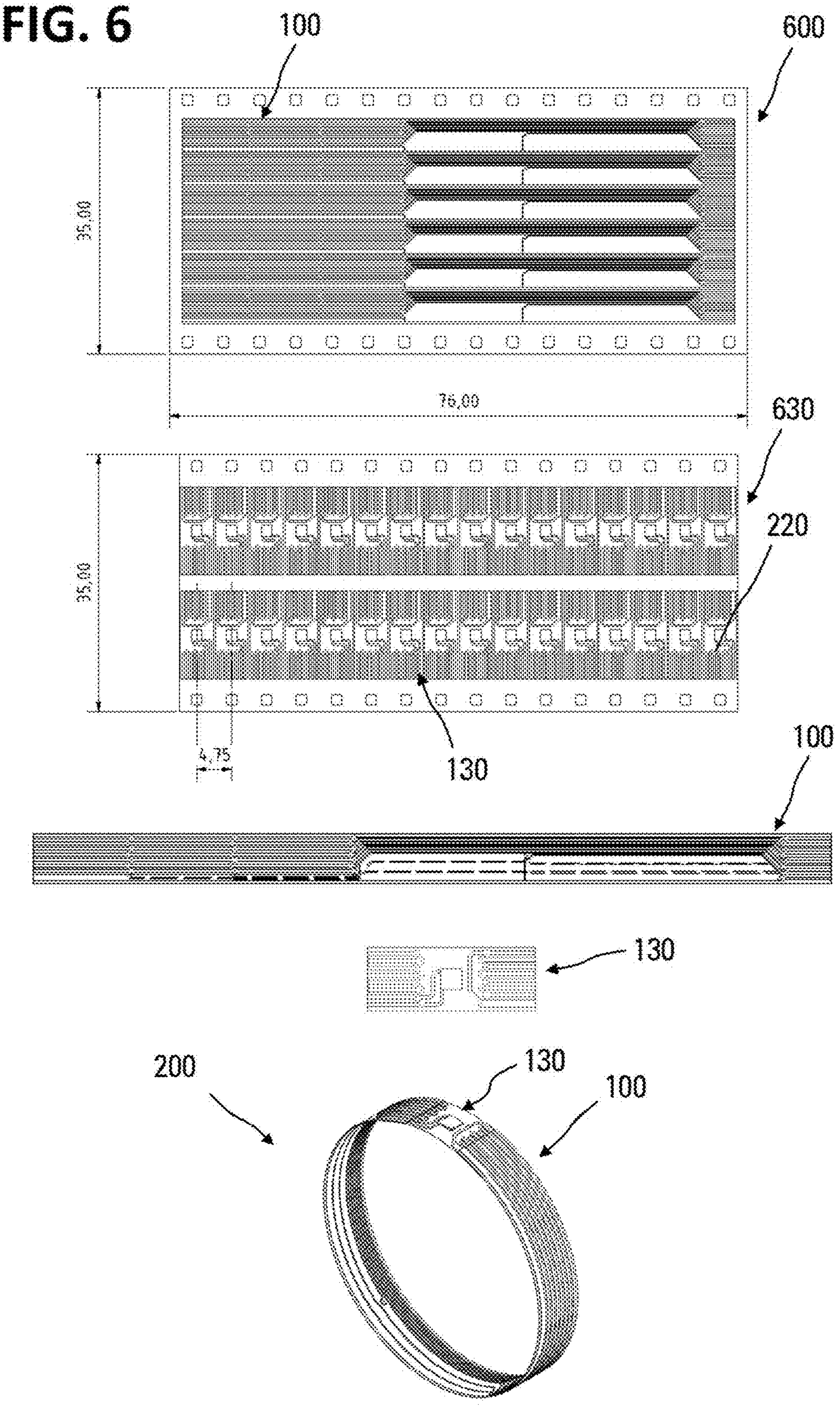
FIG. 6 illustrates a production process of an antenna structure according to various exemplary embodiments and of an annular device using the antenna structure and an auxiliary element.

Production methods in which the chip 220 is optionally already mounted during the production of the antenna structure 100 are shown as examples in FIG. 5 and FIG. 6.

FIG. 5 illustrates a production process of an antenna structure 100 (for example, the antenna structure 100 illustrated in FIGS. 1A and 1B) according to various exemplary embodiments and of an annular device 200 using the antenna structure 100.

The conductive structures (antenna tracks 104, capacitor elements 106, capacitor surfaces 116 and others, if present) can be formed, for example, in large numbers, e.g. filling the available format, on a typical 35 mm carrier strip 500, 600.

The chip 220 can optionally be already mounted on the carrier strip 500, for example by means of one of the above-mentioned methods, which enormously simplifies the production process of the annular device 200 which is formed as a contactless wearable structure.

Figure 3B:
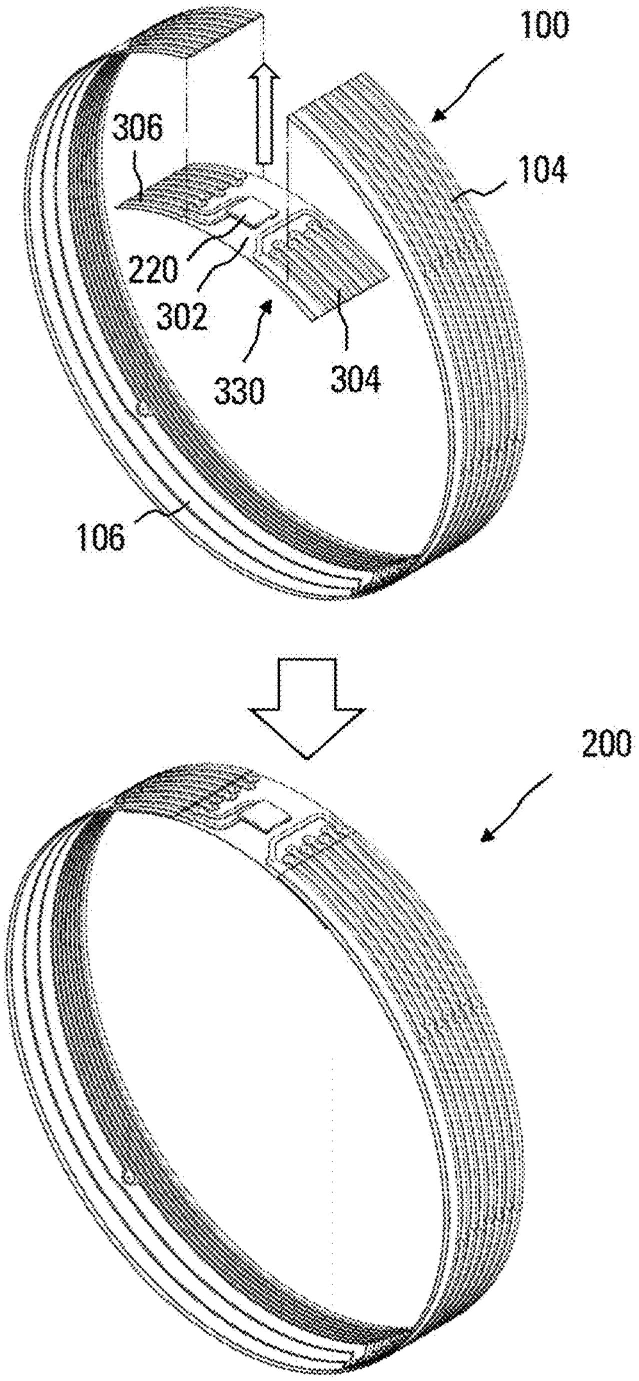

As defined in the exemplary embodiment illustrated in FIG. 3B and FIG. 6, the production process can be additionally accelerated, because in this case, the first end 102_1 and the second end 102_2 are not connected to each other directly, but by means of an auxiliary element 330. The auxiliary element may comprise additional antenna connecting tracks 304 and capacitor connecting tracks 306, which can be provided on an additional substrate 302 and are used to provide an indirect electrical connection of the antenna tracks 104. Furthermore, the auxiliary element 330 is used to provide an indirect mechanical connection of the first end 102_1 to the second end 102_2. The connection process itself (soldering, gluing) can be performed in a similar way to the direct connection of the two ends 102_1, 102_2.

A possible advantage of using the auxiliary element 330 is that in the production illustrated in FIG. 6, which is implemented for the antenna structure 100 on a carrier strip 600, similar to that described in relation to FIG. 5, with only the chip assembly omitted, the arrangement of the chips 220 is implemented on an additional carrier strip 630, which results in a significantly smaller distance between the chips 220 and thus enables the chip assembly to be speeded up.

In the figures, a size adjustment using two separation regions 108 is illustrated. In various exemplary embodiments, more or fewer separation regions 108 may be provided. A fine adjustment of the ring size can be made within the separation regions by setting the overlap region X larger or smaller, thus enabling a quasi-continuous adjustment range.

Figure 7:
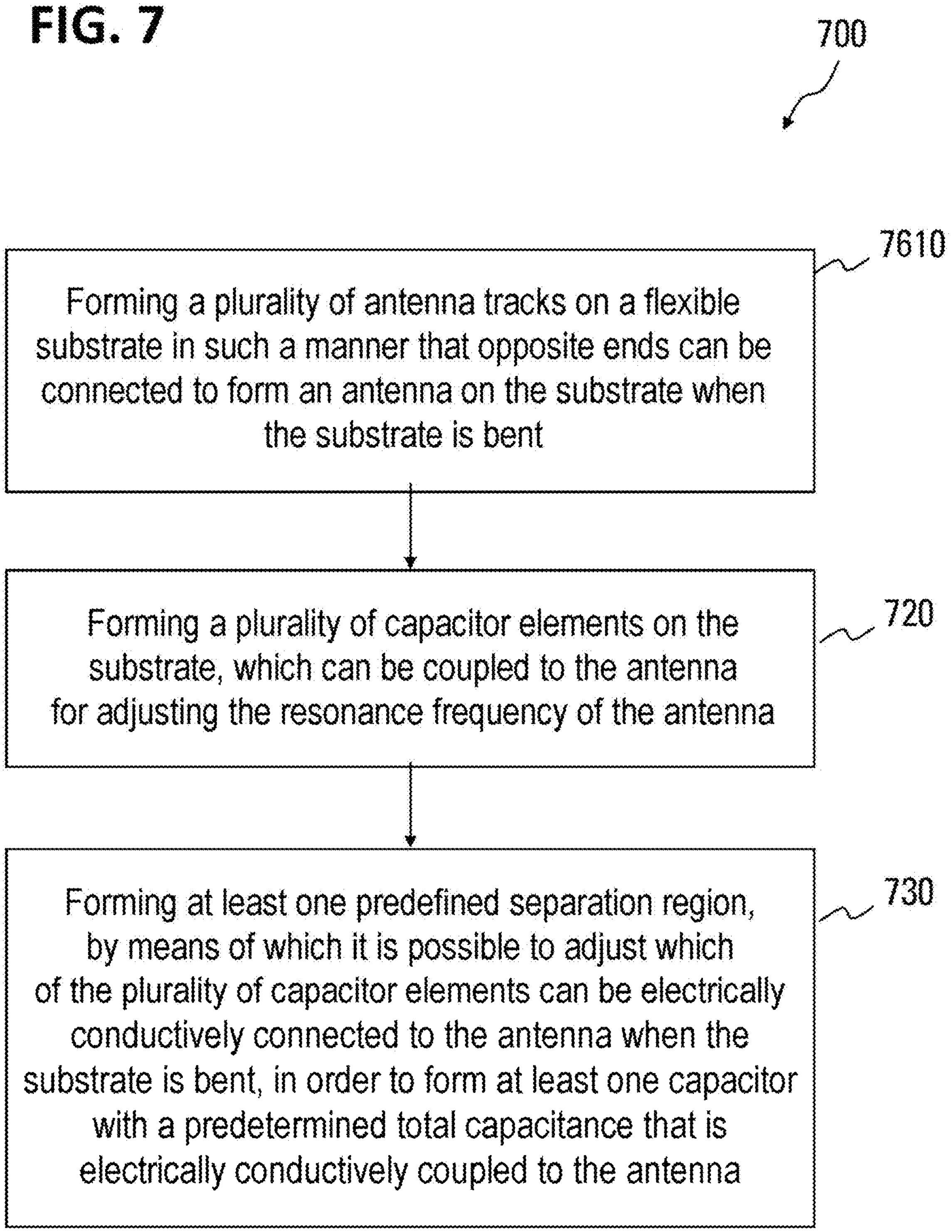
FIG. 7 shows a flowchart 800 of a method for forming an antenna structure for a contactless wearable structure according to various exemplary embodiments.

FIG. 7 shows a flowchart 700 of a method for forming an antenna structure for a contactless wearable structure according to various exemplary embodiments.

The method comprises forming a plurality of antenna tracks on a flexible substrate in such a manner that the opposite ends on the substrate can be connected to form an antenna when the substrate is bent, forming a plurality of capacitor elements on the substrate that can be coupled to the antenna for adjusting the resonance frequency of the antenna, and forming at least one predefined separation region, by means of which it is possible to adjust which of the plurality of capacitor elements can be electrically conductively connected to the antenna when the substrate is bent, in order to form at least one capacitor with a predetermined total capacitance that is electrically conductively coupled to the antenna.

Figure 8:
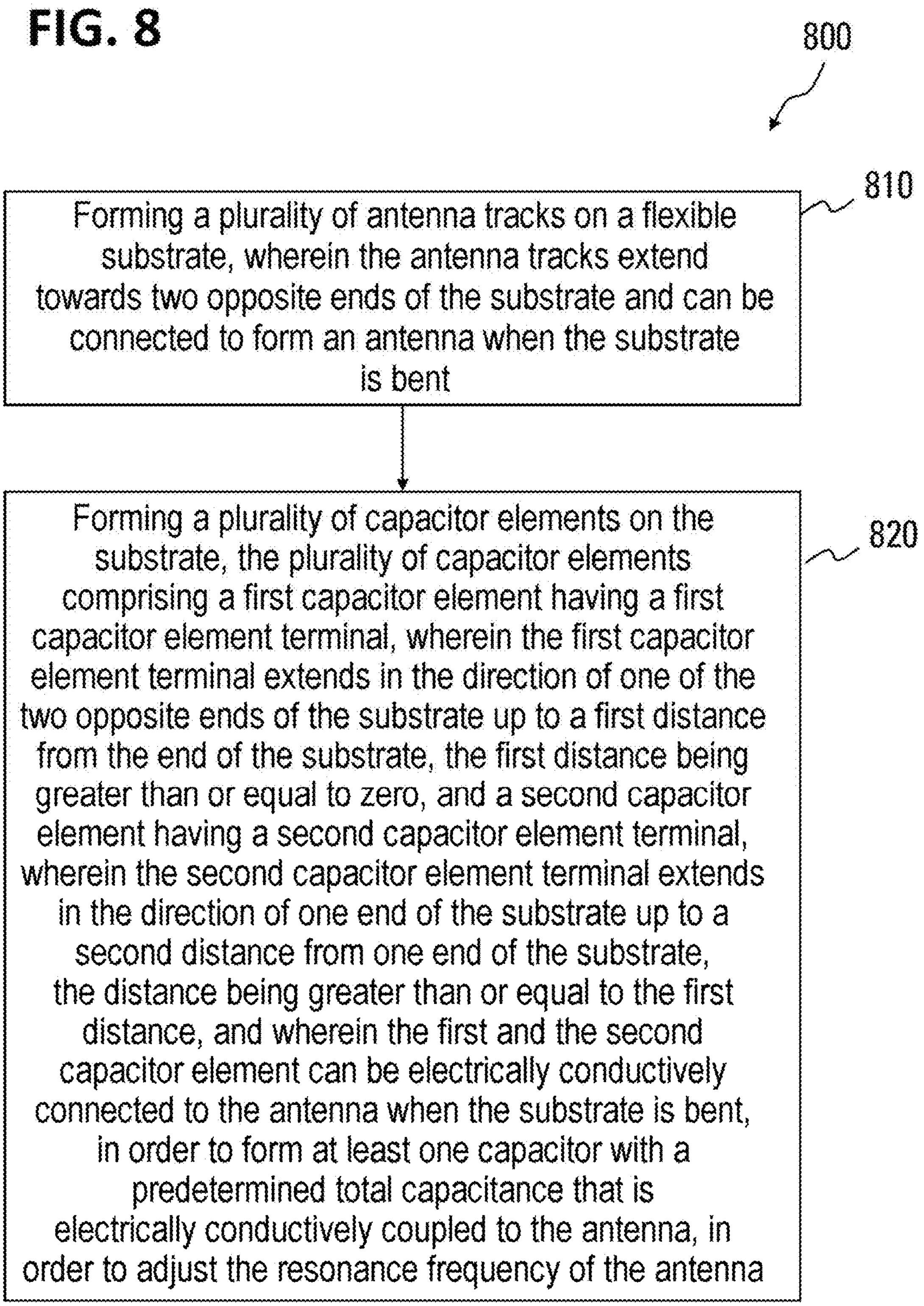
FIG. 8 shows a flowchart of a method for forming an antenna structure for a contactless wearable structure according to various exemplary embodiments.

FIG. 8 shows a flowchart 800 of a method for forming an antenna structure for a contactless wearable structure according to various exemplary embodiments.

The method comprises forming a plurality of antenna tracks on a flexible substrate, wherein the antenna tracks extend towards two opposite ends of the substrate and can be connected to form an antenna when the substrate is bent, and forming a plurality of capacitor elements on the substrate, the plurality of capacitor elements having a first capacitor element with a first capacitor element terminal, wherein the first capacitor element has a first capacitor element terminal, the first capacitor element terminal extending towards one of the two opposite ends of the substrate up to a first distance from the end of the substrate, the first distance being greater than or equal to zero, and having a second capacitor element with a second capacitor element terminal, wherein the second capacitor element terminal extends towards one end of the substrate up to a second distance from one end of the substrate, which is greater than or equal to the first distance, and wherein the first and the second capacitor element can be electrically conductively connected to the antenna when the substrate is bent, in order to form at least one capacitor electrically conductively coupled to the antenna with a predetermined total capacitance for adjusting the resonance frequency of the antenna (820).

Figure 9:
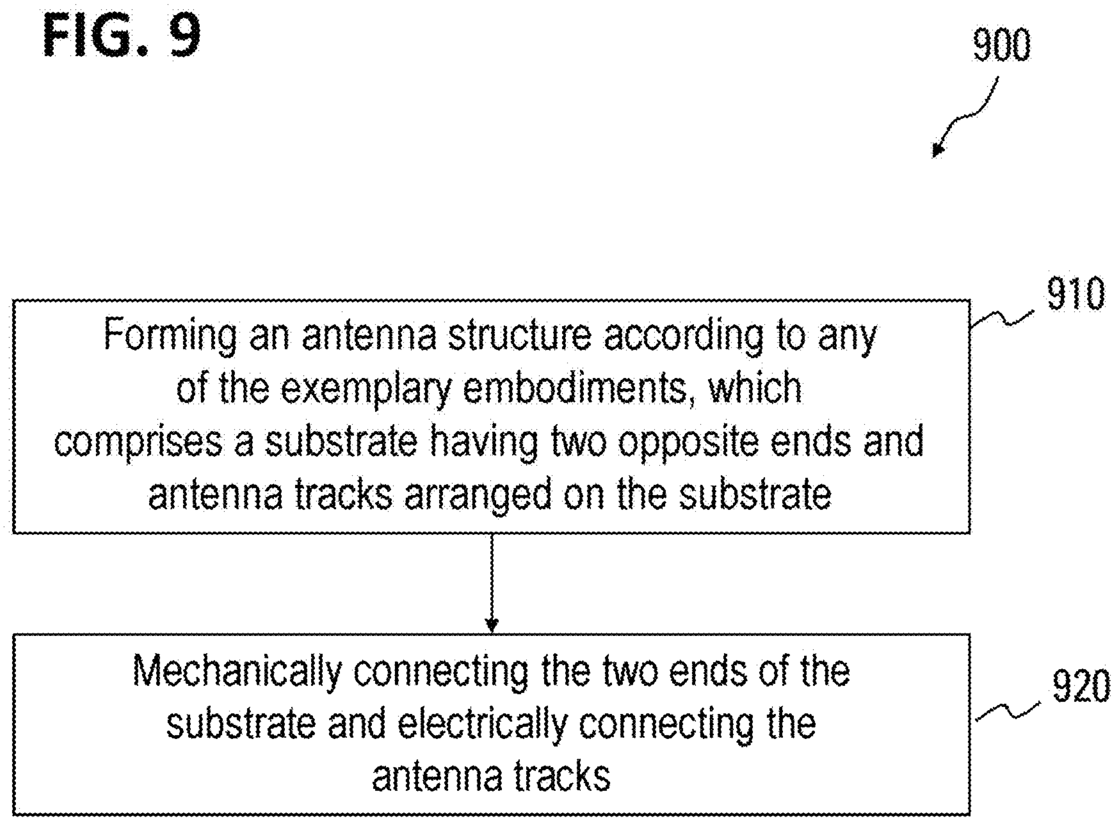
FIG. 9 shows a flowchart of a method for forming an annular device according to various exemplary embodiments.

FIG. 9 shows a flowchart 900 of a method for forming an annular device according to various exemplary embodiments.

The method comprises forming an antenna structure according to any of the exemplary embodiments, for example, as described in connection with FIG. 8 or FIG. 9 or one of the devices described above (910), and mechanically connecting the two ends of the substrate and electrically connecting the antenna tracks (920).

In the following text, a summary of some exemplary embodiments is given.

Exemplary embodiment 1 is an antenna structure for a contactless wearable structure, which comprises a plurality of antenna tracks on the substrate, the opposite ends of which can be connected to form an antenna when the substrate is bent, a plurality of capacitor elements on the substrate which can be coupled to the antenna for adjusting the resonance frequency of the antenna, and at least one predefined separation region, by means of which it is possible to adjust which of the plurality of capacitor elements can be electrically conductively connected to the antenna when the substrate is bent, in order to form at least one capacitor with a predetermined total capacitance that is electrically conductively coupled to the antenna.

Exemplary embodiment 2 is an antenna structure according to exemplary embodiment 1, configured to form the capacitor with the predetermined total capacitance by severing the antenna structure at at least one separation region or by leaving it unsevered at at least one separation region.

Exemplary embodiment 3 is an antenna structure according to exemplary embodiment 1 or 2, wherein the at least one separation region is configured as a joining region for joining the antenna structure to form a ring.

Exemplary embodiment 4 is an antenna structure for a contactless wearable structure, which comprises a flexible substrate having a plurality of antenna tracks on the substrate, which extend towards two opposite ends of the substrate and can be connected to form an antenna when the substrate is bent, and a plurality of capacitor elements on the substrate, which comprise a first capacitor element with a first capacitor element terminal, wherein the first capacitor element has a first capacitor element terminal, the first capacitor element terminal extending in the direction of one of the two opposite ends of the substrate up to a first distance from the end of the substrate, the first distance being greater than or equal to zero, and having a second capacitor element with a second capacitor element terminal, the second capacitor element terminal extending in the direction of one end of the substrate up to a second distance from one end of the substrate, which is greater than or equal to the first distance, wherein the first and optionally the second capacitor element can be electrically conductively connected to the antenna when the substrate is bent, in order to form at least one capacitor electrically conductively coupled to the antenna with a predetermined total capacitance for adjusting the resonance frequency of the antenna.

Exemplary embodiment 5 is an antenna structure according to exemplary embodiment 4, which further comprises a separation region which extends from the end of the second capacitor element terminal in the direction of the second capacitor element and allows the second capacitor element to be selected for electrically conductive connection to the antenna by severing at the separation region.

Exemplary embodiment 6 is an antenna structure according to any of the exemplary embodiments 1 to 5, which further comprises a chip which is electrically conductively connected to the antenna and is configured for contactless communication by means of the antenna.

Exemplary embodiment 7 is an antenna structure according to any of the exemplary embodiments 1 to 3, 5 or 6, wherein the antenna tracks are configured in such a manner that they can be connected by directly connecting the two opposite ends of the substrate without or after severing of the antenna structure at the separation region.

Exemplary embodiment 8 is an antenna structure according to any of the exemplary embodiments 1 to 3, 5 or 6, wherein the antenna tracks are configured in such a manner that they can be connected by means of an indirect connection using an auxiliary element, without or after severing of the antenna structure at the separation region.

Exemplary embodiment 9 is an antenna structure according to exemplary embodiment 8, further configured to create, by means of the auxiliary element, an electrically conductive connection between the antenna and a chip arranged on the auxiliary element to provide contactless communication by means of the antenna.

Exemplary embodiment 10 is an antenna structure according to any of the exemplary embodiments 1 to 9, wherein the antenna tracks are arranged on two opposite main sides of the substrate and are electrically conductively connected to each other through the substrate by means of vias.

Exemplary embodiment 11 is an antenna structure according to any of the exemplary embodiments 1 to 10, wherein the plurality of capacitor elements are arranged on the same main side of the substrate.

Exemplary embodiment 12 is an antenna structure according to exemplary embodiment 11, which further comprises at least one additional capacitor surface, which is arranged on another main side of the substrate opposite the same main side of the substrate.

Exemplary embodiment 13 is an antenna structure according to exemplary embodiment 12, wherein the at least one additional capacitor surface is a continuous surface, which corresponds in size and position to the opposite plurality of capacitor elements.

Exemplary embodiment 14 is an annular device having an antenna structure according to any of the exemplary embodiments 1 to 13.

Exemplary embodiment 15 is an annular device according to exemplary embodiment 14, wherein the antenna tracks are soldered at the two opposite ends of the substrate without or after severing at the separation region.

Exemplary embodiment 16 is an annular device according to exemplary embodiment 15, wherein the antenna tracks are soldered directly to each other or to an intermediate element.

Exemplary embodiment 17 is an annular device according to any of the exemplary embodiments 14 to 16, wherein at least one of the plurality of capacitor elements is electrically conductively coupled to the antenna.

Exemplary embodiment 18 is an annular device according to any of the exemplary embodiments 14 to 17, wherein at least one of the plurality of capacitor elements is electrically isolated from the antenna.

Exemplary embodiment 19 is a method for forming an antenna structure for a contactless wearable structure. The method comprises forming a plurality of antenna tracks on a flexible substrate in such a manner that opposite ends on the substrate can be connected to form an antenna when the substrate is bent, forming a plurality of capacitor elements on the substrate that can be coupled to the antenna for adjusting the resonance frequency of the antenna, and forming at least one predefined separation region, by means of which it is possible to adjust which of the plurality of capacitor elements can be electrically conductively connected to the antenna when the substrate is bent, in order to form at least one capacitor with a predetermined total capacitance that is electrically conductively coupled to the antenna.

Exemplary embodiment 20 is a method according to exemplary embodiment 19, wherein the antenna structure and the capacitor elements are formed in such a manner that the total capacitance of the capacitor that can be formed can be set by severing the antenna structure at the at least one separation region or by leaving it unsevered at the least one separation region.

Exemplary embodiment 21 is a method according to exemplary embodiment 19 or 20, wherein the at least one separation region is configured as a joining region for joining the antenna structure to form a ring.

Exemplary embodiment 22 is a method for forming an antenna structure for a contactless wearable structure. The method comprises forming a plurality of antenna tracks on a flexible substrate, wherein the antenna tracks extend towards two opposite ends of the substrate and can be connected to form an antenna when the substrate is bent, forming a plurality of capacitor elements on the substrate, the plurality of capacitor elements having a first capacitor element with a first capacitor element terminal, wherein the first capacitor element has a first capacitor element terminal, the first capacitor element terminal extending in the direction of one of the two opposite ends of the substrate up to a first distance from the end of the substrate, the first distance being greater than or equal to zero, and having a second capacitor element with a second capacitor element terminal, the second capacitor element terminal extending in the direction of one end of the substrate up to a second distance from one end of the substrate, which is greater than or equal to the first distance, and wherein the first and the second capacitor element can be electrically conductively connected to the antenna when the substrate is bent, in order to form at least one capacitor electrically conductively coupled to the antenna with a predetermined total capacitance for adjusting the resonance frequency of the antenna.

Exemplary embodiment 23 is a method according to exemplary embodiment 22, which further comprises forming a separation region which extends from the end of the second capacitor element terminal in the direction of the second capacitor element and allows the second capacitor element to be selected for electrically conductive connection to the antenna by severing at the separation region.

Exemplary embodiment 24 is a method according to any of the exemplary embodiments 19 to 23, which further comprises electrically conductively connecting a chip to the antenna, wherein the chip is configured for contactless communication by means of the antenna.

Exemplary embodiment 25 is a method according to any of the exemplary embodiments 19 to 21, 23 or 24, wherein the antenna tracks are configured in such a manner that they can be connected by directly connecting the two opposite ends of the substrate without or after severing of the antenna structure at the separation region.

Exemplary embodiment 26 is a method according to any of the exemplary embodiments 19 to 21, 23 or 24, wherein the antenna tracks are configured in such a manner that they can be connected by means of an indirect connection using an auxiliary element, without or after severing of the antenna structure at the separation region.

Exemplary embodiment 27 is a method according to exemplary embodiment 26, further configured to create, by means of the auxiliary element, an electrically conductive connection between the antenna and a chip arranged on the auxiliary element for providing contactless communication by means of the antenna.

Exemplary embodiment 28 is a method according to any of the exemplary embodiments 19 to 27, wherein the antenna tracks are arranged on two opposite main sides of the substrate and are electrically conductively connected to each other through the substrate by means of vias.

Exemplary embodiment 29 is a method according to any of the exemplary embodiments 19 to 28, wherein the plurality of capacitor elements are arranged on the same side of the substrate.

Exemplary embodiment 30 is a method according to exemplary embodiment 29, which further comprises at least one additional capacitor surface, which is arranged on another main side of the substrate opposite the same main side of the substrate.

Exemplary embodiment 31 is a method according to exemplary embodiment 30, wherein the at least one additional capacitor surface is a continuous surface, which corresponds in size and position to the opposite plurality of capacitor elements.

Exemplary embodiment 32 is a method for forming an annular device. The method comprises forming an antenna structure according to any of the exemplary embodiments 19 to 31, mechanically connecting the two ends of the substrate and electrically connecting the antenna tracks.

Exemplary embodiment 33 is a method according to exemplary embodiment 32, wherein the mechanical and the electrical connection operation comprises a direct connection of the two ends or an indirect connection by means of an auxiliary element.

Additional advantageous designs of the device are obtained from the description of the method and vice versa.

The invention claimed is:

1. An antenna structure for a contactless wearable structure, comprising:

a flexible substrate;

a plurality of antenna tracks on the substrate, the opposite ends of which are connectable to form an antenna on the substrate when the substrate is bent;

a plurality of capacitor elements on the substrate that are couplable to the antenna to adjust the resonance frequency of the antenna, the plurality of capacitor elements comprising at least a first capacitor element and a second capacitor element having respective terminals extending different distances from an end of the substrate; and at least one predefined separation region extending from at least one of the plurality of capacitor elements, by means of which it is possible to adjust which of the plurality of capacitor elements are electrically connectable to the antenna when the substrate is bent by severing or leaving unsevered at the predefined separation region, thereby forming at least one capacitor with a predetermined total capacitance that is electrically coupled to the antenna.

2. The antenna structure as claimed in claim 1, wherein the at least one separation region is configured as a joining region for joining the antenna structure to form a ring.

3. The antenna structure as claimed in claim 1, further comprising:

a chip that is electrically connected to the antenna and is configured for contactless communication using the antenna.

4. The antenna structure as claimed in claim 1, wherein the antenna tracks are configured in such a manner that they are connectable using direct connection of two opposite ends of the substrate without or after a severing of the antenna structure at the separation region.

5. The antenna structure as claimed in claim 1, wherein the antenna tracks are configured to be connectable using an indirect connection using an auxiliary element without or after severing the antenna structure at the separation region.

6. The antenna structure as claimed in claim 5, further configured to create, using the auxiliary element, an electrically electrical connection between the antenna and a chip arranged on the auxiliary element to provide contactless communication using the antenna.

7. The antenna structure as claimed in claim 1, wherein the antenna tracks are arranged on two opposite main sides of the substrate and electrically connected to each other through the substrate using vias.

8. The antenna structure as claimed in claim 1, wherein the plurality of capacitor elements are arranged on the same main side of the substrate.

9. The antenna structure as claimed in claim 8, further comprising:

at least one additional capacitor surface which is arranged on another main side of the substrate opposite the same main side.

10. The antenna structure as claimed in claim 9, wherein the at least one additional capacitor surface is a continuous surface, which corresponds in size and position to the plurality of opposite capacitor elements.

11. An annular device having an antenna structure as claimed in claim 1.

12. The annular device as claimed in claim 11, wherein the antenna tracks are soldered at two opposite ends of the substrate without or after severing at the separation region.

13. The annular device as claimed in claim 12, wherein the antenna tracks are soldered directly to each other or to an intermediate element.

14. The annular device as claimed in claim 11, wherein at least one of the plurality of capacitor elements is electrically conductively coupled to the antenna.

15. An antenna structure for a contactless wearable structure, comprising:

a flexible substrate;

a plurality of antenna tracks on the substrate, which extend towards two opposite ends of the substrate and are connectable to form an antenna when the substrate is bent; and a plurality of capacitor elements, comprising:

a first capacitor element having a first capacitor element terminal extending in a direction of one of the two opposite ends of the substrate up to a first distance from the end of the substrate, the first distance being greater than or equal to zero; and a second capacitor element having a second capacitor element terminal extending in a direction of one end of the substrate up to a second distance from one end of the substrate, the second distance being greater than or equal to the first distance; and at least one predefined separation region extending from the second capacitor element terminal, by means of which;

the first and second capacitor elements are selectively electrically connectable to the antenna when the substrate is bent by severing at the separation region, thereby forming at least one capacitor with a predetermined total capacitance electrically coupled to the antenna, in order to adjust the resonance frequency of the antenna.

16. A method for forming an antenna structure for a contactless wearable structure, the method comprising:

forming a plurality of antenna tracks on a flexible substrate in such a manner that opposite ends are connectable to form an antenna on the substrate when the substrate is bent;

forming a plurality of capacitor elements on the substrate comprising at least a first capacitor element and a second capacitor element having respective terminals extending different distances from an end of the substrate, and which are couplable to the antenna for adjusting the resonance frequency of the antenna; and forming at least one predefined separation region extending from at least one of the plurality of capacitor elements, by which the plurality of capacitor elements are respectively electrically connectable to the antenna when the substrate is bent by severing or leaving unsevered at the predefined separation region, thereby forming at least one capacitor with a predetermined total capacitance that is electrically coupled to the antenna.

17. A method for forming an annular device, comprising:

forming an antenna structure as claimed in claim 16; and mechanically connecting the two ends of the substrate and electrically connecting the antenna tracks.

18. A method for forming an antenna structure for a contactless wearable structure, comprising:

forming a plurality of antenna tracks on a flexible substrate, wherein the antenna tracks extend towards two opposite ends of the substrate and are connectable to form an antenna when the substrate is bent; and forming a plurality of capacitor elements on the substrate, the plurality of capacitor elements comprising:

a first capacitor element having a first capacitor element terminal extending in a direction of one of the two opposite ends of the substrate up to a first distance from the end of the substrate, the first distance being greater than or equal to zero; and a second capacitor element having a second capacitor element terminal extending in a direction of one end of the substrate up to a second distance from one end of the substrate, the second distance being greater than or equal to the first distance; and forming at least one predefined separation region extending from the second capacitor element terminal, wherein the first and the second capacitor elements are electrically connectable to the antenna when the substrate is bent by severing at the separation region, thereby forming at least one capacitor with a predetermined total capacitance that is electrically coupled to the antenna, in order to adjust the resonance frequency of the antenna.

* * * * *